(12) United States Patent
Ram Mohan Maddala et al.

(10) Patent No.: US 11,222,449 B2
(45) Date of Patent: Jan. 11, 2022

(54) SMART VISUALIZATION TRANSFORMATION FOR INTUITIVE PRESENTATIONS

(71) Applicant: EMC IP HOLDING COMPANY LLC, Hopkinton, MA (US)

(72) Inventors: Rakesh Ram Mohan Maddala, Bangalore (IN); Timothy Ramamurthy, Bangalore (IN); Rameshkrishnan Subramanian, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/168,900

(22) Filed: Oct. 24, 2018

(65) Prior Publication Data
US 2020/0134892 A1  Apr. 30, 2020

(51) Int. Cl.
*G06T 11/40* (2006.01)
*G06T 11/60* (2006.01)
*G06F 3/0484* (2013.01)

(52) U.S. Cl.
CPC .......... *G06T 11/40* (2013.01); *G06F 3/04842* (2013.01); *G06F 3/04845* (2013.01); *G06T 11/60* (2013.01)

(58) Field of Classification Search
CPC .. G06F 3/048; G06F 3/04842; G06F 3/04845; G06F 8/20; G06T 11/40; G06T 11/60
See application file for complete search history.

(56) References Cited

U.S. PATENT DOCUMENTS

| | | | | |
|---|---|---|---|---|
| 9,736,288 B1* | 8/2017 | Parmar | ................. | G06F 3/0485 |
| 10,592,260 B1* | 3/2020 | Gould | ................... | G06F 40/197 |
| 2010/0106283 A1* | 4/2010 | Harvill | ..................... | D05C 5/04 |
| | | | | 700/138 |
| 2010/0211883 A1* | 8/2010 | Lee | ....................... | H04L 12/282 |
| | | | | 715/740 |
| 2014/0372956 A1* | 12/2014 | Bisca | ..................... | G06F 16/93 |
| | | | | 715/848 |
| 2015/0243257 A1* | 8/2015 | Witman | .................. | G06F 9/451 |
| | | | | 345/522 |
| 2016/0314102 A1* | 10/2016 | Bezar | .................. | G06F 17/2288 |

OTHER PUBLICATIONS

Mwalongo et al. (NPL "State-of-the-Art Report in Web-based Visualization") Citation: Mwalongo, Finian, et al. "State-of-the-Art Report in Web-based Visualization." Computer graphics forum. vol. 35. No. 3. 2016 (Year: 2016).*

(Continued)

*Primary Examiner* — Diane M Wills
(74) *Attorney, Agent, or Firm* — Krishnendu Gupta; Lesley Leonessa

(57) ABSTRACT

A method is used in processing graphics in computing environments. A user interface layer receives a request from a user to rasterize an interactive image rendered in a user interface. A rasterizing module rasterizes the interactive image at the user interface layer associated with the user interface. The rasterizing module transmits the rasterized image to a reporting service for reporting out the rasterized image.

20 Claims, 7 Drawing Sheets

(56) References Cited

OTHER PUBLICATIONS

SAS, "SAS 9.4 ODS Graphics Designer User's Guide", Third Edition, SAS Institute Inc., Jul. 2015, p. 3-8, 45-84 (Year: 2015).*

Goncalves et al., "BiGGEsTS: integrated environment for biclustering analysis of time series gene expression data", BMC Research Notes, 2009. (Year: 2009).*

Waese et al., "Data Visualization Tools for Large Biological Data Sets", A thesis submitted in conformity with the requirements for the degree of Doctor of Philosophy, Department of Cell and Systems Biology, University of Toronto, 2017, chapters 1, 2, and 4 (Year: 2017).*

Badam, Sriram Karthik, Eli Fisher, and Niklas Elmqvist. "Munin: A peer-to-peer middleware for ubiquitous analytics and visualization spaces." IEEE Transactions on Visualization and Computer Graphics 21.2 (2014): 215-228 (Year: 2014).*

* cited by examiner

SMART VISUALIZATION TRANSFORMATION FOR INTUITIVE PRESENTATIONS

BACKGROUND

Technical Field

This application relates to processing graphics for smart visualization transformation for intuitive presentations in computing environments.

Description of Related Art

Scalable Vector Graphics (SVG) are used, for example, in charting libraries for representing different data sets based on a user's interaction with the charts. SVG charts depend on backend services for rasterization of the SVG charts.

SUMMARY OF THE INVENTION

In accordance with one aspect of the invention is a method used in processing graphics in computing environments. A user interface receives a request from a user to rasterize an interactive image rendered in a user interface. A rasterizing module rasterizes the interactive image at a user interface layer associated with the user interface. The user interface layer transmits the rasterized image to a reporting service for reporting out the rasterized image.

In accordance with one aspect of the invention is a system used in processing graphics in computing environments. A user interface receives a request from a user to rasterize an interactive image rendered in a user interface. A rasterizing module rasterizes the interactive image at a user interface layer associated with the user interface. The user interface layer transmits the rasterized image to a reporting service for reporting out the rasterized image.

In accordance with another aspect of the invention, a computer program product comprising a computer readable medium is encoded with computer executable program code. The code enables execution across one or more processors for processing graphics in computing environments. A user interface receives a request from a user to rasterize an interactive image rendered in a user interface. A rasterizing module rasterizes the interactive image at a user interface layer associated with the user interface. The user interface layer transmits the rasterized image to a reporting service for reporting out the rasterized image.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
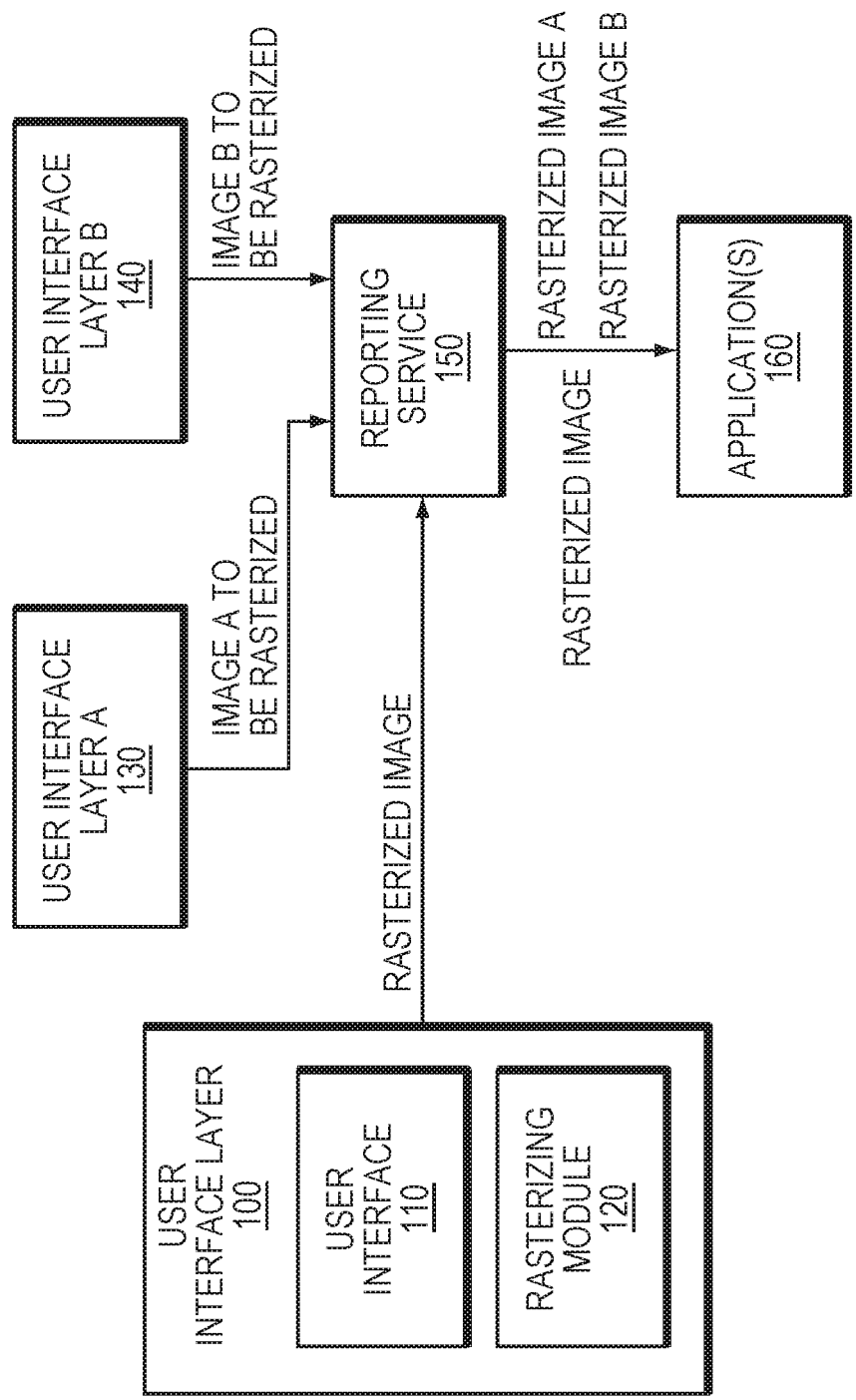
FIG. 1 an example of an embodiment of processing graphics in computing environments, in accordance with an embodiment of the present disclosure.

Described below is a technique for use in processing graphics in computing environments, which technique may be used to provide, among other things, receiving, by a user interface, a request from a user to rasterize an interactive image rendered in a user interface, rasterizing, by a rasterizing module, the interactive image at a user interface layer associated with the user interface, an transmitting by the user interface layer, the rasterized image to a reporting service for reporting out the rasterized image.

Reporting is critical aspect of any business for statistical and comparative analysis. These analyses drive the business growth. At the same time dynamic graphs and animated images need to be captured in raster format for documenting and presentations. One example of dynamic graphs and animated images is Scalable Vector Graphics (SVG).

SVG are used, for example, in charting libraries for representing different datasets based on user interactions. SVG interactive images, such as SVG charts are created and rendered as different charts (and different types of charts) based on the variety of data inputs provided by users interacting with the SVG charts. It is a challenging task to capture all permutations of the user interactions. As the users interact with the SVG charts, the permutations of those interactions are captured and rasterized for embedding into documents, reports, spreadsheets, presentations, etc. Rasterization is the technique of inputting vector graphics format (shapes), and converting it into a raster image (pixels or dots). The permutations of the users' interactions are rasterized because the document/report/spreadsheet/presentation applications support raster image formats, such as Portable Network Graphics (PNG), Joint Photographic Experts Group (JPEG), etc.

Generating a quality image when rasterizing permutations of user interactions is important when creating documents/spreadsheets/presentations/etc. The users' ability to interact with data, and with the SVG charts that represents the data, is also very important. Conventional technologies allow users to interact with the SVG charts, for example, to analyze critical business information while comparing with different inputs, but conventional technologies do not provide a way to capture those interactions. Instead, the user must find a way to articulate the various comparisons and interpretations of the user's interactions with the SVG chart. Thus one goal of embodiments disclosed herein is to provide the user(s) with a way to capture the user's interactions with SVG.

The software applications that generates SVG charts rely on backend services to rasterize the images (i.e., permutations of the users' interactions) created by the applications that generate SVG charts. When multiple users are interacting with SVG charts, the backend services perform the rasterization for the multiple rasterized images required by each of the users. For example, if 50 users are interacting with a SVG chart, and each user produces 4 documents based on the SVG chart, the backend service must rasterize 200 images to provide rasterized images for the users. This overhead may reduce the performance of the backend services and increase the processing time for performing the rasterization of the images. Thus, conventional technologies overload backend services, especially when multiple users are interacting with SVG charts and requesting that those interactions be rasterized into image formats compatible with document/spreadsheet/presentation/etc. software.

Conventional technologies do not provide a technique for capturing multiple permutations of the users' interactions with the SVG chart. For example, a user may interact with a SVG chart and capture data for several permutations, such as yearly data, monthly data, weekly data, daily data, region specific data, etc. These various permutations each produce a separate chart, and separate calls are made to the backend service to rasterize each chart. These backend calls may overload the backend service, leading to longer processing times, and an overall unsatisfactory experience for the users. Conventional technologies that use backend services for rasterization have scalability and reliability issues. Conventional technologies that require a backend service for rasterization increase the cost, implementation complexity, maintenance, and operation of the rasterizing system. Conventional technologies that rely on backend services for rasterization do not have intelligence built on the client end that allows users to capture and save the interactions with the interactive images, such as SVG.

By contrast, in at least some implementations in accordance with the current technique as described herein, a user interface receives a request from a user to rasterize an interactive image rendered in a user interface. A rasterizing module rasterizes the interactive image at a user interface layer associated with the user interface. The user interface layer transmits the rasterized image to a reporting service for reporting out the rasterized image.

Thus, another one goal of embodiments disclosed herein is to provide a rasterization technique that eliminates backend dependency without compromising the quality of the rasterized images. The rasterized image (i.e., the byte array) comprises the exact visualization of the SVG, along with color and styles as depicted in the SVG. This results in less overhead, and better performance of the backend service. The backend services are not overloaded by multiple users. Instead, rasterization is performed at the user interface layer to reduce the load on the backend service, and produce rasterized images more efficiently. Embodiments disclosed here in leverage browser capabilities to convert the SVG document image using, for example, JavaScript®. Embodiment disclosed herein enhance the performance of the backend services by passing a rasterized image to the backend service, where the backend service reports out the rasterized image "as is". Embodiments disclosed herein enhance performance and provide flexibility by capturing the user interactions for different inputs into a byte array. The byte array is then passed over to the backend service which is used "as is" within dynamic reporting or dynamic presentation templates.

Embodiments disclosed herein bridge the gap between dynamic data visualization using SVG charts, and the representation of the SVG charts in a static environment using raster images for documentation and presentations.

In at least some implementations in accordance with the current technique described herein, the use of processing graphics in computing environments can provide one or more of the following advantages: providing intelligence that allows users to capture and save the interactions with the interactive images, such as capturing multiple permutations of user interactions with SVG, generating a quality image rasterizing permutations of user interactions, eliminating the dependency on backend services without compromising the quality of rasterized images, reducing load on backend services, decreasing processing time for rasterization of images, decreasing the cost, implementation complexity, maintenance, and operation of a rasterizing system, increasing efficiency of producing rasterized images, leveraging browser capabilities to convert the SVG to rasterized images, and bridging the gap between dynamic data visualization using SVG charts and the representation of the SVG charts in a static environment using raster images for documentation and presentations.

In contrast to conventional technologies, in at least some implementations in accordance with the current technique as described herein, a user interface layer receives a request from a user to rasterize an interactive image rendered in a user interface. A rasterizing module rasterizes the interactive image at a user interface layer associated with the user interface. The user interface layer transmits the rasterized image to a reporting service for reporting out the rasterized image.

In an example embodiment of the current technique, the reporting service provides the rasterized image to the user for embedding in an application.

In an example embodiment of the current technique, the user interface layer receives a request from the user to save at least one version of the interactive image, where the user has interacted with the interactive image to create at least one version.

In an example embodiment of the current technique, the rasterizing module rasterizes at least one version of the interactive image to create another rasterized image, and adds that rasterized image to an array of rasterized images requested by the user.

In an example embodiment of the current technique, the rasterizing module captures a plurality of attributes that define the interactive image, and creates a two dimensional image from the plurality of attributes. The rasterizing module converts the two dimensional image into a byte array to create the rasterized image.

In an example embodiment of the current technique, the interactive image is a vector image. The rasterizing module obtains the plurality of attributes from an eXtensible Markup Language (XML) data structure that defines the vector image.

In an example embodiment of the current technique, the rasterizing module uses the plurality of attributes to define a HyperText Markup Language (HTML) element in a script, where the two dimensional image is rendered in the HTML element using JavaScript® when the script is executed. In an example embodiment, a HTML canvas element is used to draw a graphic that represents the interactive image as a rasterized image. The rasterizing module 120 captures all the styles defined in the SVG that represents the interactive image. The rasterizing module 120 draws the interactive image on the canvas, which is then converted to the rasterized image. In an example embodiment, the byte array that represents the rasterized image is added to a list, for example, in a JavaScript® array.

In an example embodiment of the current technique, the rasterizing module obtains raster image data from the rendered two dimensional image.

In an example embodiment of the current technique, transmitting the rasterized image to the reporting service for rendering the rasterized image avoids usage of resources associated with the reporting service by rasterizing the interactive image at the user interface layer.

In an example embodiment of the current technique, the reporting service is a backend restful service deployed on a web server.

FIG. 1 an example of an embodiment of processing graphics in computing environments, in accordance with an embodiment of the present disclosure. In an example embodiment, a user interacts with an interactive image using a user interface 110. The SVG chart is rendered in the user interface at the user interface layer. In an example embodiment, the user may be interacting with an SVG chart, and may choose to save a particular version, or "view" of the SVG chart. In an example embodiment, the "views" represent different data sets based on a user's or multiple users' interaction or interactions with the charts. The user may also choose to rasterize one or more "views" of the SVG chart. The user interface layer 100 receives the request to rasterize the interactive image (i.e., the "view" or multiple "views" of the SVG chart). In response, the rasterizing module 120 rasterizes the interactive image at the user interface layer 100, and transmits the rasterized image to a reporting service 150 for reporting out the rasterized image. Conventionally, the reporting service 150 may provide rasterizing services for multiple user interface layers, such as User Interface Layer A, and User Interface Layer B, meaning that User Interface Layer A, and User Interface Layer B each respectively transmit an image ("Image A to be Rasterized" and "Image B to be Rasterized") to be rasterized to the reporting service 150. The reporting service 150 performs the rasterizing of "Image A to be Rasterized" and "Image B to be Rasterized", creating "Rasterized Image A" and "Rasterized Image B". It should be noted that there may be more User Interface Layers (not shown) for which the reporting service 150 provides rasterizing services. This means that conventionally, the reporting service 150 resources may be overwhelmed with the task of rasterizing images for the User Interface Layers (i.e., User Interface Layer A, User Interface Layer B, and other User Interface Layers (not shown)). In contrast to conventional technologies, the rasterizing module 120 on the user interface layer 100 performs the rasterizing processing of the interactive image, sparing the reporting service 150 of this task. In an example embodiment, regardless of whether the rasterizing module 120 or User Interface Layer A, User Interface Layer B, or User Interface Layers (not shown) perform the rasterizing task, the reporting service 150 transmits the rasterized images (i.e., "rasterized image", "Rasterized Image A", and "Rasterized Image B") to one or more applications 160 for embedding. For example, a user may capture several "views" of the interactive image, and embed the rasterized images of those "views" into, for example, a document, spreadsheet, presentation, web page, etc. In many cases, the document, spreadsheet and/or presentation applications may only support raster image formats such as PNG, JPEG, etc.

Figure 2:
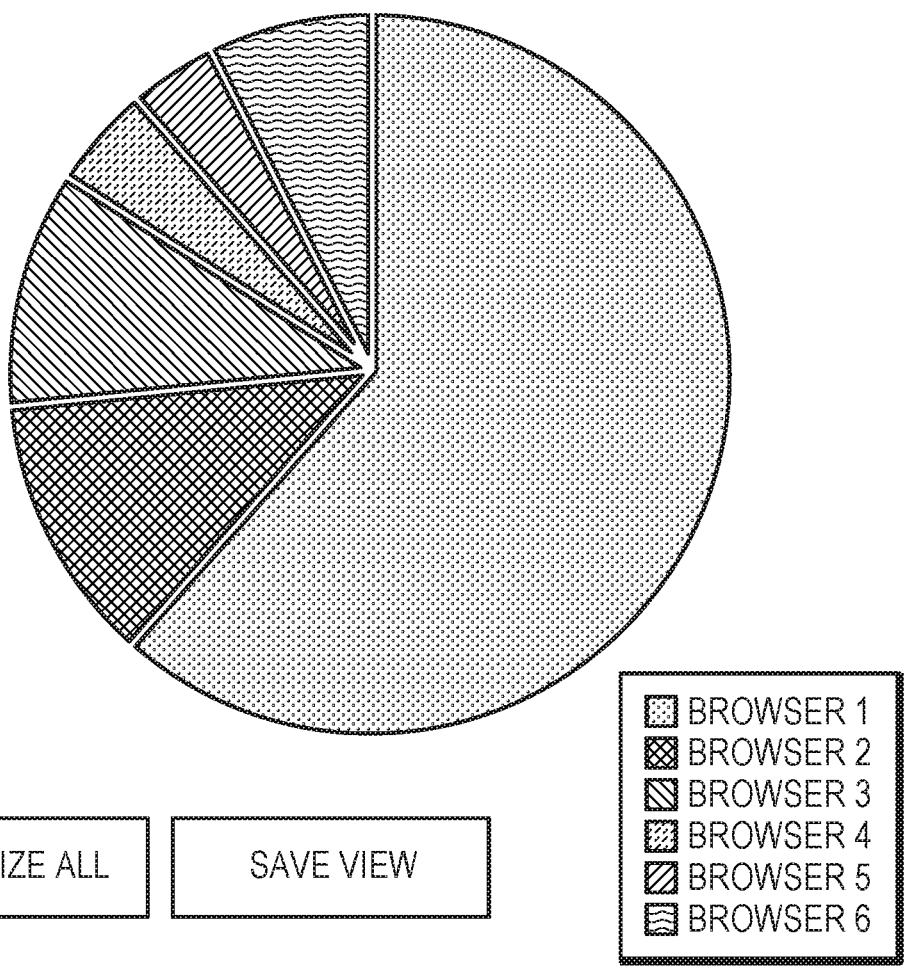
FIG. 2 illustrates an example an interactive image rendered in a user interface, in accordance with an example of the present disclosure.

FIG. 2 illustrates an example an interactive image rendered in a user interface, in accordance with an example of the present disclosure. In an example embodiment, a user may interact with an interactive image to, for example, manipulate the data that is represented by the interactive image. As the user interacts with the interactive image, the user may choose to select the "Save View" button to save various representations of those interactions. The user may choose to save one or more representations of the interactions. For example, as illustrated in FIG. 2, the user is interacting with a "Browser Market shares in January 2018" chart. The user may choose to interact with the SVG chart (i.e., the "Browser Market shares in January 2018" chart) to, for example, remove one or more of the browsers represented in the SVG chart. For example, the user may remove "Browser 1" and "Browser 2", and then re-run the application to see the updated chart. The updated chart is a "view" of the SVG chart, and can be saved when the user selects the "Save View" button. The user may save one or more "views" of the SVG chart. The user may also choose to select the "Rasterize All" button, which will rasterize the "views" the user has saved. It should be noted that other techniques may be used to capture a "view" and/or indicate that the user desires to rasterize the selected interactive images. In an example embodiment, as each "view" is rasterized, the rasterizing module 120 adds the rasterized image, as a byte array to a list in, for example a JavaScript® array. The list of byte arrays for each "view" (i.e., each interaction the user has with the interactive image, and is captured using the "Save View" button, or by any other technique) is maintained, for example, inside a JSON object. The JSON object is then transmitted to the reporting service 150 where the reporting service 150 reports out the rasterized images. In an example embodiment, the byte array that is generated by the rasterizing module 120 is the exact visualization of the "Saved" SVG chart, with the colors and styles as they are depicted within the SVG chart. Thus, embodiments disclosed herein provide a method to isolate and execute the rasterization process at the user interface layer 100. The rasterizing module 120 rasterizes interactive image for user requested "views".

Figure 3:
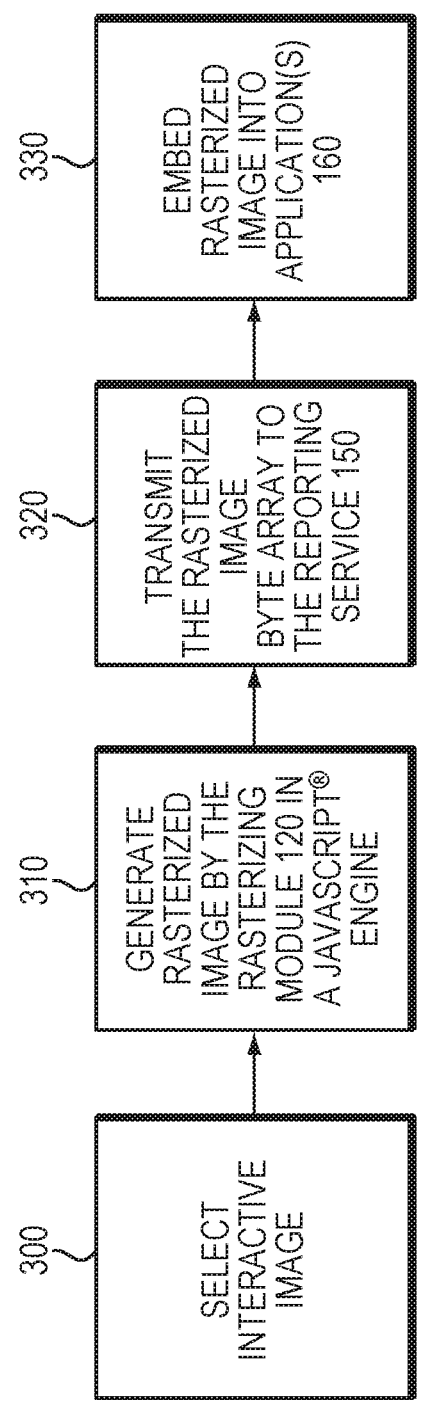
FIG. 3 illustrates an example high level process of processing graphics in computing environments, in accordance with an embodiment of the present disclosure.

FIG. 3 illustrates an example high level process of processing graphics in computing environments, in accordance with an embodiment of the present disclosure. The workflow depicted in FIG. 3 provides rasterization, for example, in a JavaScript® engine within the browser. Thus, the task of rasterizing the SVG is removed from the reporting service 150 (i.e., the backend services), and provided, instead, by the user interface layer 100 (i.e., the frontend). This reduces the load on the backend service, and results in faster report generation. At 300, a user selects an interactive image. As explained in FIG. 1 and FIG. 2, the user interacts with an interactive image, such as an SVG chart within the user interface 110, and may capture several "views" of the interactive image. The user interface layer 100 receives a request to rasterize the captured 'views" (i.e., one or more of the interactive image). At 310, the rasterizing module 120 generates a rasterized image, for example, in a JavaScript® Engine. At 320, the rasterizing module 120 transmits the rasterized image byte array to the reporting service 150, for example, for presentation and documentation purposes. The reporting service 150 reports out the rasterized image, and the user may then embed the rasterized image into one or more applications(s) 160.

Figure 4:
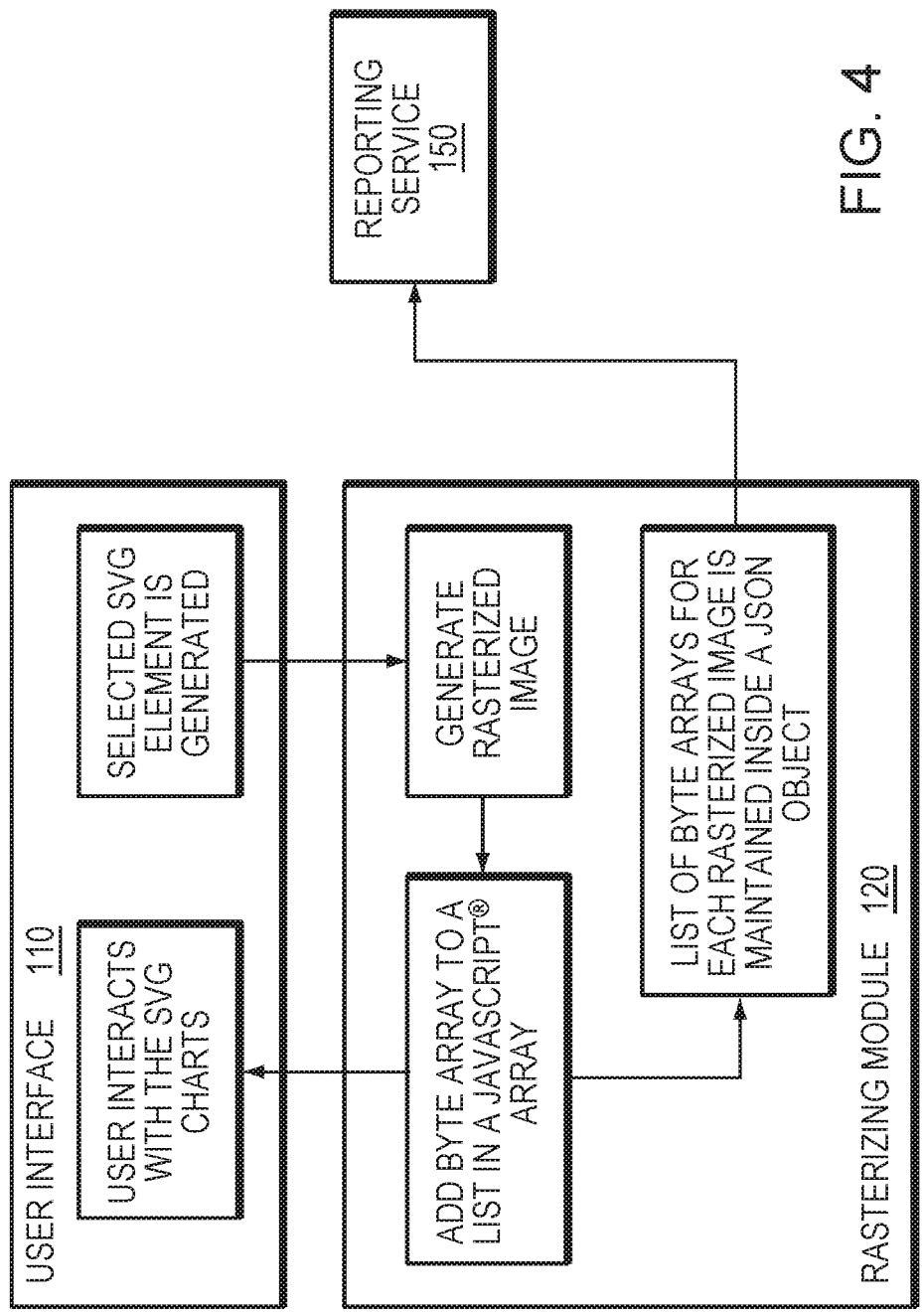
FIG. 4 illustrates an example process of processing graphics in computing environments, in accordance with an embodiment of the present disclosure.

FIG. 4 illustrates an example process of processing graphics in computing environments, in accordance with an embodiment of the present disclosure. In an example embodiment, the user interacts with the SVG charts, for example, to display various sets of data. When the user chooses to select the "Save View" button to save a particular "view" (or permutation) of the SVG chart, the selected SVG element is generated. The rasterizing module 120 generates a rasterized image of the "view" of the SVG chart that the user selected to when the user selected the "Save View" button. In other words the rasterizing module 120 generates a rasterized image of the generated selected SVG element. In an example embodiment, the rasterizing module 120 generates the rasterized image in a JavaScript® engine. The rasterizing module 120 adds the byte array to a list in a JavaScript® array. If the user has selected several "views" (or permutations) using the "Save View" button, the rasterizing module 120 iteratively generates a rasterized image for each of those "views" and adds each rasterized image (byte array) to a list in a JavaScript® array. In an example embodiment, the list of byte arrays for each rasterized image is maintained within a JSON object. The JSON object is transmitted to the reporting service 150 for reporting out.

Figure 5:
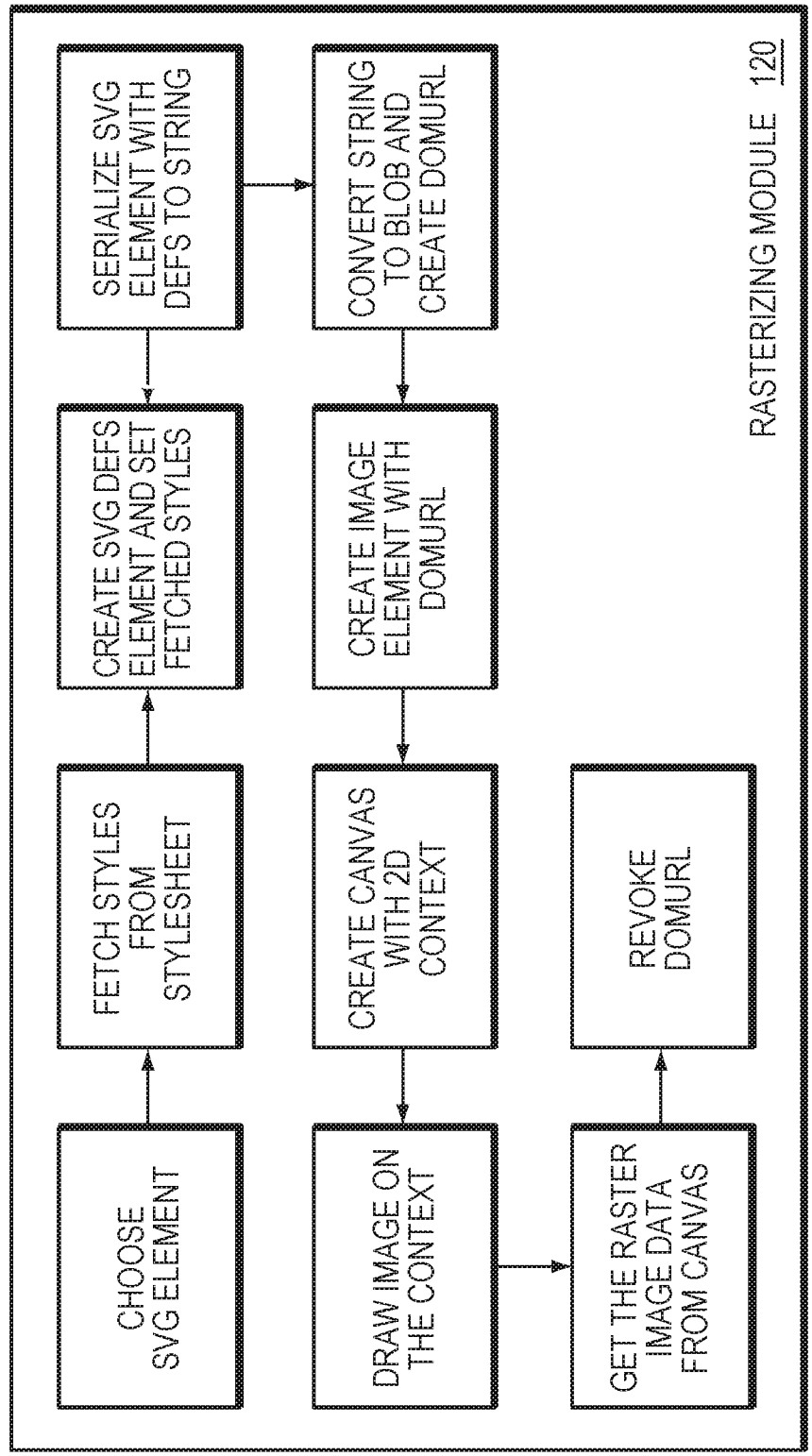
FIG. 5 illustrates an example rasterizing process, in accordance with an embodiment of the present invention.

FIG. 5 illustrates an example rasterizing process, in accordance with an embodiment of the present invention. In an example embodiment, the user selects an interactive image to save using the "Save View" button. In response, the rasterizing module 120 generates the rasterized image from the SVG interactive image that the user "Saved". FIG. 5 represents a flow chart of an implementation that uses a HTML5 canvas to draw graphics using JavaScript®. The rasterizing module 120 captures all the styles defined within SVG object, and draws the SVG interactive image on the HTML canvas. The HTML canvas is then converted to a byte array that represents the SVG interactive image as for example, a PNG image (i.e., the rasterized image).

Figure 6:
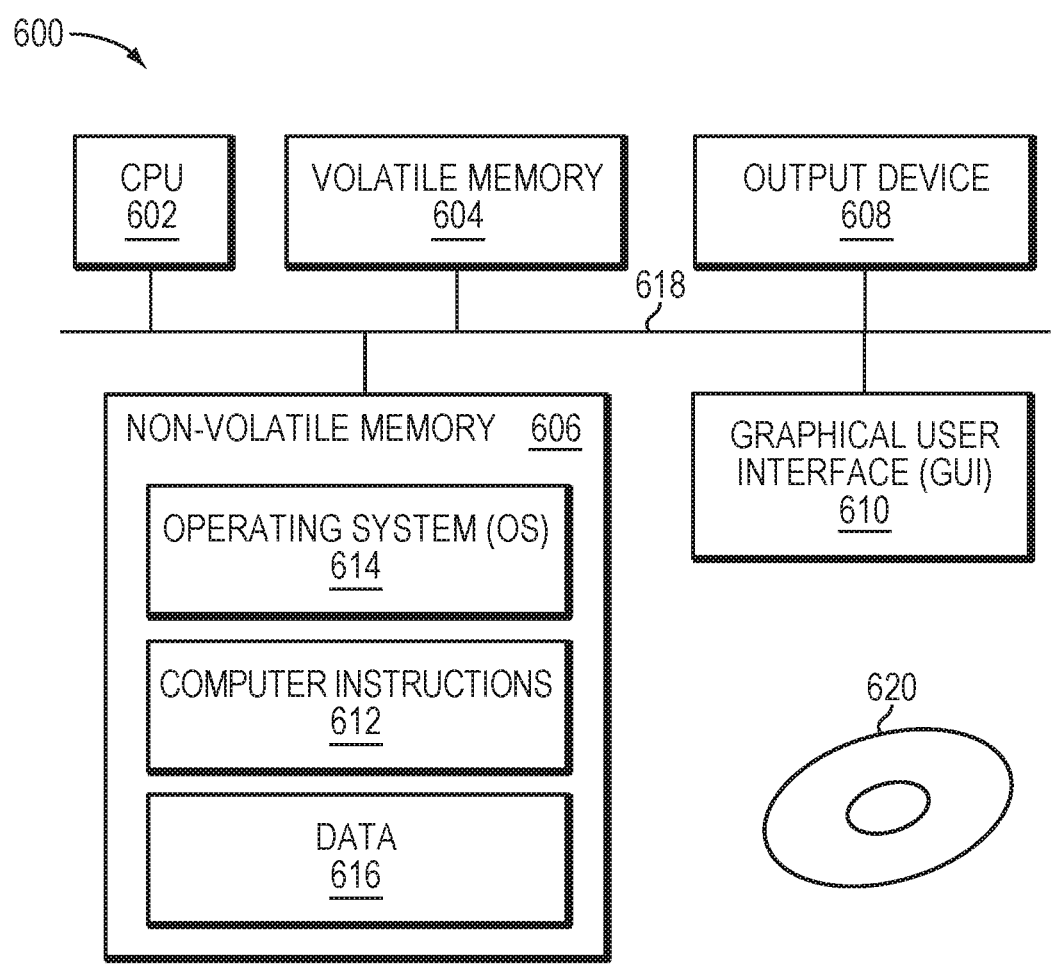
FIG. 6 is a block diagram of a computer, in accordance with an embodiment of the present disclosure.

FIG. 6 illustrates a block diagram of a computer 600 that can perform at least part of the processing described herein, according to one embodiment. The computer 600 may include a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 may be configured to store computer instructions 612, an operating system 614, and data 616. In one example, the computer instructions 612 are executed by the processor 602 out of volatile memory 604. In one embodiment, an article 620 comprises non-transitory computer-readable instructions. In some embodiments, the computer 600 corresponds to a virtual machine (VM). In other embodiments, the computer 600 corresponds to a physical computer.

Figure 7:
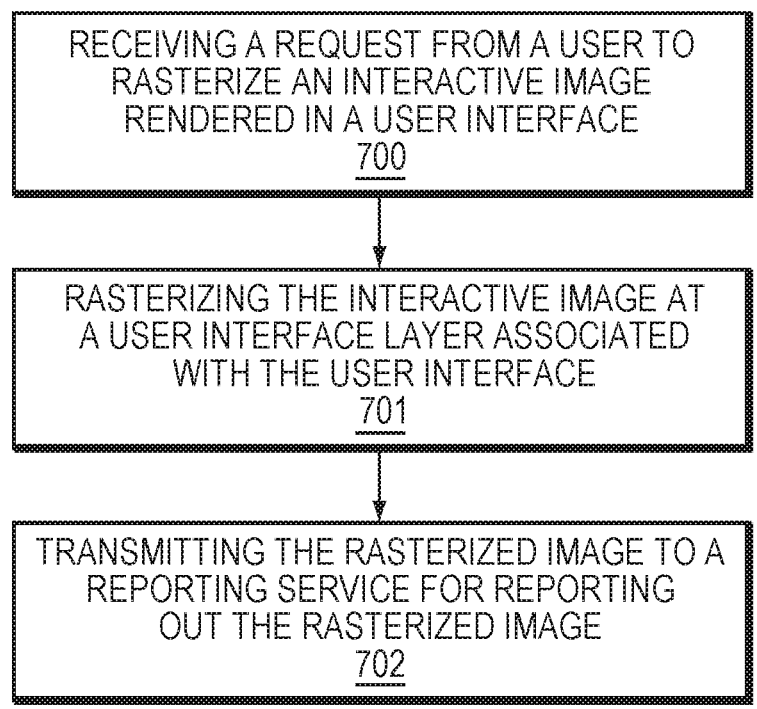
FIG. 7 is a flow diagram illustrating processes that may be used in connection with techniques disclosed herein.

Referring to FIG. 7, shown is a more detailed flow diagram illustrating processing graphics in computing environments. With reference also to FIGS. 1-6, the user interface layer 100 receives a request from a user to rasterize an interactive image rendered in a user interface 110 (Step 700). In an example embodiment, the user interface layer 100 receives a request from the user to save at least one version of the interactive image, where the user has interacted with the interactive image to create at least one version. As illustrated in FIG. 1 and FIG. 2, a user may interact with a SVG element, such as an SVG chart, manipulating the data to create several different "views" of the SVG chart. The user may select the "Save View" button to save one or more of the "views". The user may also choose to "Rasterize All" such that the saved "views" are converted from SVG to a rasterized image and transmitted to the reporting service 150, for example, for embedding in a document, spreadsheet, presentation, etc. Thus, embodiments disclosed herein provide intelligence built on the client end that allows users to capture and save the interactions with the interactive images, such as SVG charts. Embodiments disclosed herein leverage browser capabilities to convert the SVG to rasterized images.

In an example embodiment, the rasterizing module 120 rasterizes the interactive image at a user interface layer 100 associated with the user interface 110 (Step 701). In an example embodiment, the rasterizing module 120 rasterizes at least one version of the interactive image (for example, one or more of the permutations of the users' interactions with SVG charts) to create one or more rasterized images. The rasterizing module 120 adds the rasterized images (i.e., the one or more rasterized images that were created by the rasterizing module 120) to an array of rasterized images requested by the user. In an example embodiment, the rasterizing module 120 captures a plurality of attributes that define the interactive image, as illustrated in FIG. 5, by the steps of "Choose SVG element" and "Fetch Styles From Stylesheet". The rasterizing module 120 creates a two dimensional image from the plurality of attributes, and converts the two dimensional image into a byte array to create the rasterized image.

In an example embodiment, the interactive image (i.e., the one or more permutations of the users' interactions with SVG charts that the user has saved, for example, using the "Save View" button as illustrated in FIG. 2) is a vector image. In an example embodiment, the rasterizing module 120 obtains the plurality of attributes from an eXtensible Markup Language (XML) data structure that defines the vector image. SVG images and their behaviors are defined in XML text files. For example, the <style> SVG element allows style sheets to be embedded directly within SVG content. In an example embodiment, the plurality of attributes is obtained during the "Fetch Styles From Stylesheets" step illustrated in FIG. 5. In an example embodiment, when the rasterizing module 120 creates the two dimensional image from the plurality of attributes, the rasterizing module 120 uses the plurality of attributes to define a HyperText Markup Language (HTML) element in a script. For example, the HTML element may be a canvas element. The two dimensional image is rendered in the HTML element using JavaScript® when the script is executed. In an example embodiment, the rasterizing module 120 obtains raster image data from the rendered two dimensional image.

In an example embodiment, the user interface layer 100 transmits the rasterized image to a reporting service for reporting out the rasterized image (Step 702). In an example embodiment, the reporting service 150 is a backend restful service deployed on a web server. In an example embodiment, the reporting service 150 provides the rasterized image to the user for embedding in applications(s) 160 such as a document, spreadsheet, presentation, etc. Thus, usage of resources associated with the reporting service 150 is avoided by rasterizing the interactive image at the user interface layer. In other words, the drain on the reporting service 150 that usually occurs when the reporting service 150 performs the rasterization is avoided by having the rasterization performed by the rasterizing module 120 at the user interface layer 100. Thus, rasterizing the interactive images on the client end eliminates the dependency on backend services without compromising the quality of rasterized images.

There are several advantages to embodiments disclosed herein. For example, the method provides intelligence that allows users to capture and save the interactions with the interactive images, such as capturing multiple permutations of user interactions with SVG. The method generates a quality image rasterizing permutations of user interactions. The method eliminates the dependency on backend services without compromising the quality of rasterized images. The method reduces load on backend services. The method decreases processing time for rasterization of images. The method decreases the cost, implementation complexity, maintenance, and operation of a rasterizing system. The method increases efficiency of producing rasterized images. The method leverages browser capabilities to convert the SVG to rasterized images. The method bridges the gap between dynamic data visualization using SVG charts and the representation of the SVG charts in a static environment using raster images for documentation and presentations.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing graphics in computing environments, the method comprising:
   receiving a request from a user to rasterize an interactive image rendered in a user interface, wherein the interactive image is Scalable Vector Graphics;
   eliminating a rasterizing dependency on a reporting service by rasterizing the interactive image at a user interface layer associated with the user interface, to avoid adding to a processing load at the reporting service;
   rasterizing a plurality of Scalable Vector Graphics interactive images at the user interface layer and adding each rasterized image as a byte array to a list of byte arrays,
   wherein an HTML canvas element is used to draw a graphic that represents the Scalable Vector Graphics interactive image as the rasterized image; and
   transmitting the list of byte arrays to the reporting service for reporting out the rasterized images,
   wherein each of the rasterized images represents a saved user interaction with the interactive image,
   wherein each byte array comprises a rasterized image, and
   wherein the transmitting avoids adding to the processing load at the reporting service by eliminating separate calls to the reporting server for each of the rasterized images in the list of byte array.

2. The method of claim 1, further comprising:
   providing, by the reporting service, the rasterized image to the user for embedding in an application.

3. The method of claim 1, wherein receiving the selection of the interactive image rendered in the user interface comprises:
   receiving a request from the user to save at least one version of the interactive image, wherein the user has interacted with the interactive image to create the at least one version.

4. The method of claim 3, wherein rasterizing the interactive image at the user interface layer associated with the user interface comprises:
   rasterizing the at least one version of the interactive image to create another rasterized image; and
   adding the another rasterized image to an array of rasterized images requested by the user.

5. The method of claim 3, wherein rasterizing the interactive image at the user interface layer associated with the user interface comprises:
   capturing a plurality of attributes that define the interactive image;
   creating a two dimensional image from the plurality of attributes; and
   converting the two dimensional image into a byte array to create the rasterized image.

6. The method of claim 5, wherein the interactive image is a vector image, and wherein capturing the plurality of attributes that define the interactive image comprises:
   obtaining the plurality of attributes from an eXtensible Markup Language (XML) data structure that defines the vector image.

7. The method of claim 5, wherein creating the two dimensional image from the plurality of attributes comprises:
   using the plurality of attributes to define a HyperText Markup Language (HTML) element in a script, wherein the two dimensional image is rendered in the HTML element when the script is executed.

8. The method of claim 7, wherein converting the two dimensional image into the byte array to create the rasterized image comprises:
  obtaining raster image data from the rendered two dimensional image.

9. The method of claim 1, wherein rasterizing the interactive image at the user interface layer comprises:
  receiving, by a rasterizing module, the interactive image;
  capturing, by the rasterizing module, styles defined within the interactive image;
  drawing, by the rasterizing module, the interactive image on an HTML canvas; and
  converting, by the rasterizing module, the HTML canvas to a byte array that represents the interactive image.

10. The method of claim 1, wherein the reporting service is a backend restful service deployed on a web server.

11. A system for use in processing graphics in computing environments, the system comprising a processor configured to:
  receive a request from a user to rasterize an interactive image rendered in a user interface, wherein the interactive image is Scalable Vector Graphics;
  eliminate a rasterizing dependency on a reporting service by rasterizing the interactive image at a user interface layer associated with the user interface, to avoid adding to a processing load at the reporting service;
  rasterize a plurality of Scalable Vector Graphics interactive images at the user interface layer and adding each rasterized image as a byte array to a list of byte arrays, wherein an HTML canvas element is used to draw a graphic that represents the Scalable Vector Graphics interactive image as the rasterized image; and
  transmit the list of byte arrays to the reporting service for reporting out the rasterized images,
  wherein each of the rasterized images represents a saved user interaction with the interactive image,
  wherein each byte array comprises a rasterized image, and
  wherein the transmitting avoids adding to the processing load at the reporting service by eliminating separate calls to the reporting server for each of the rasterized images in the list of byte arrays.

12. The system of claim 11, wherein the processor configured to receive the selection of the interactive image rendered in the user interface is further configured to:
  receive a request from the user to save at least one version of the interactive image, wherein the user has interacted with the interactive image to create the at least one version.

13. The system of claim 12, wherein the processor configured to rasterize the interactive image at the user interface layer associated with the user interface is further configured to:
  rasterize the at least one version of the interactive image to create another rasterized image; and
  add the another rasterized image to an array of rasterized images requested by the user.

14. The system of claim 12, wherein the processor configured to rasterize the interactive image at the user interface layer associated with the user interface is further configured to:
  capture a plurality of attributes that define the interactive image;
  create a two dimensional image from the plurality of attributes; and
  convert the two dimensional image into a byte array to create the rasterized image.

15. The system of claim 14, wherein the interactive image is a vector image, and wherein the processor configured to capture the plurality of attributes that define the interactive image is further configured to:
  obtain the plurality of attributes from an eXtensible Markup Language (XML) data structure that defines the vector image.

16. The system of claim 14, wherein the processor configured to create the two dimensional image from the plurality of attributes is further configured to:
  use the plurality of attributes to define a HyperText Markup Language (HTML) element in a script, wherein the two dimensional image is rendered in the HTML element when the script is executed.

17. The system of claim 11, wherein the processor configured to rasterize the interactive image at the user interface layer is further configured to:
  receive, by a rasterizing module, the interactive image;
  capture, by the rasterizing module, styles defined within the interactive image;
  draw, by the rasterizing module, the interactive image on an HTML canvas; and
  convert, by the rasterizing module, the HTML canvas to a byte array that represents the interactive image.

18. The system of claim 11, wherein the reporting service is a backend restful service deployed on a web server.

19. A computer program product for processing graphics in computing environments, the computer program product comprising:
  a non-transitory computer readable storage medium having computer executable program code embodied therewith, the program code executable by a computer processor to:
  receive a request from a user to rasterize an interactive image rendered in a user interface, wherein the interactive image is Scalable Vector Graphics;
  eliminate a rasterizing dependency on a reporting service by rasterizing the interactive image at a user interface layer associated with the user interface, to avoid adding to a processing load at the reporting service;
  rasterize a plurality of Scalable Vector Graphics interactive images at the user interface layer and adding each rasterized image as a byte array to a list of byte arrays, wherein an HTML canvas element is used to draw a graphic that represents the Scalable Vector Graphics interactive image as the rasterized image; and
  transmit the list of byte arrays to the reporting service for reporting out the rasterized images,
  wherein each of the rasterized images represents a saved user interaction with the interactive image,
  wherein each byte array comprises a rasterized image, and
  wherein the transmitting avoids adding to the processing load at the reporting service by eliminating separate calls to the reporting server for each of the rasterized images in the list of byte arrays.

20. The computer program product of claim 19, wherein the processor configured to transmit the rasterized image to the reporting service for rendering the rasterized image and is further configured to:
  avoid usage of resources associated with the reporting service by rasterizing the interactive image at the user interface layer.

* * * * *